(12) United States Patent
Goulet

(10) Patent No.: US 8,016,168 B2
(45) Date of Patent: Sep. 13, 2011

(54) DISPENSE VALVE

(75) Inventor: Douglas P. Goulet, Big Lake, MN (US)

(73) Assignee: IMI Vision Limited, Alcester, Warwickshire (GB)

( * ) Notice: Subject to any disclaimer, the term of this patent is extended or adjusted under 35 U.S.C. 154(b) by 557 days.

(21) Appl. No.: 12/154,492

(22) Filed: May 23, 2008

(65) Prior Publication Data

US 2008/0290308 A1 Nov. 27, 2008

(30) Foreign Application Priority Data

May 26, 2007 (GB) .................................. 0710143.9

(51) Int. Cl.
*B22D 37/00* (2006.01)
*B67D 7/80* (2010.01)
*F16K 5/00* (2006.01)

(52) U.S. Cl. ..... 222/509; 222/516; 222/518; 222/146.6; 251/310

(58) Field of Classification Search ............... 222/146.6, 222/145.1, 400.7, 400.8, 505, 508, 509, 511, 222/518, 564, 559, 516; 239/548; 251/310, 251/313; 62/389, 390, 391, 392, 393, 394, 395, 396, 397, 398, 399, 400

See application file for complete search history.

(56) References Cited

U.S. PATENT DOCUMENTS

| 4,655,374 | A | * | 4/1987 | Guerette | .................. 222/504 |
| 5,394,715 | A | * | 3/1995 | Guerette | .................. 70/177 |
| 5,487,493 | A | * | 1/1996 | McNabb | .................. 222/153.14 |
| 5,813,574 | A | | 9/1998 | McNabb | |
| 6,702,159 | B2 | * | 3/2004 | Itou et al. | .................. 222/400.7 |
| 7,077,299 | B2 | * | 7/2006 | Amidzich | .................. 222/518 |

FOREIGN PATENT DOCUMENTS

| GB | 2348185 A | 9/2000 |
| GB | 2357751 A | 7/2001 |

* cited by examiner

*Primary Examiner* — Kevin P Shaver
*Assistant Examiner* — Stephanie E Williams
(74) *Attorney, Agent, or Firm* — Pyle & Piontek, LLC

(57) ABSTRACT

A dispense tap for a frozen beverage machine has a transition section defining a tapered bore with an inlet for frozen beverage from a freeze barrel of the machine and an outlet for frozen beverage controlled by a valve operable by a handle. The handle is rotatable to allow frozen beverage to flow from the transition section through a dispense cavity in the valve for exiting the tap. The outlet has a cross-section greater than the cross-section of the inlet which prevents ice conglomerating and forming a plug in the bore of the transition section.

7 Claims, 2 Drawing Sheets

DISPENSE VALVE

This application claims priority from GB Application No. 0710143.9, filed 26 May 2007.

BACKGROUND OF THE INVENTION

This invention relates to dispense valves and in particular, but not exclusively to a dispense valve inlet for a machine for making frozen beverages.

FIELD OF THE INVENTION

Known machines for making frozen carbonated beverages (FCBs) typically have a horizontally arranged freeze barrel for containing, mixing and freezing the beverage ingredients of water, carbon dioxide and flavor additive. A dispense tap is arranged on a front, customer facing end of the barrel to dispense the FCB once it has been sufficiently frozen and mixed in the barrel.

It is known to provide a dispense valve with a transition section for delivering FCB from the product freeze barrel into the main body of the valve. This transition section has a bore for carrying the FCB. Typically the bore is of a constant cross-section along its length.

However, this conventional design of transition section is prone to freezing up, that is to say that the flow of FCB stagnates in the bore causing ice conglomeration which eventually grows to block the bore.

OBJECT OF THE INVENTION

It is an object of the current invention to provide an improved dispense valve which at least mitigates some of the above problems.

SUMMARY OF THE INVENTION

According to the invention there is provided a dispense valve for a frozen beverage machine having a transition section and a valve body, the transition section arranged to carry frozen beverage from a freeze barrel of the machine to the valve body, the valve body including a valve for controlling flow of frozen beverage from the freeze barrel, wherein the transition section defines a tapered bore having an outlet of greater cross-section than its inlet.

Advantageously the tapered form of the transition section prevents the conglomeration of ice since the beverage is able to move along the bore. Even if the beverage becomes stationary within the bore, the formation of ice will not form a plug within the bore, which in not the case in a bore of constant cross-section.

Preferably, the taper is at least 2 degrees on each side of the bore.

Preferably the valve has a rotary actuation mechanism, more preferably the valve body comprises a dispense cavity and rotary motion of the valve body aligns the outlet of the tapered bore with an inlet of the dispense cavity. By use of a rotary motion to open and shut off two flow paths, no valve members are required to be disposed within the flow path such that they would obstruct fluid, in particular any plugs of ice within the fluid, from passing therethrough. Preferably the tapered bore and the dispense cavity are free of any restrictions. More preferably, the cross-section of the flow path within the valve does not decrease downstream of the tapered bore outlet, thus any plug of ice passing therethrough will be prevented from becoming stuck therein restricting the flow.

The invention will now be described with reference to the following drawings, in which:

DETAILED DESCRIPTION

Figure 1:
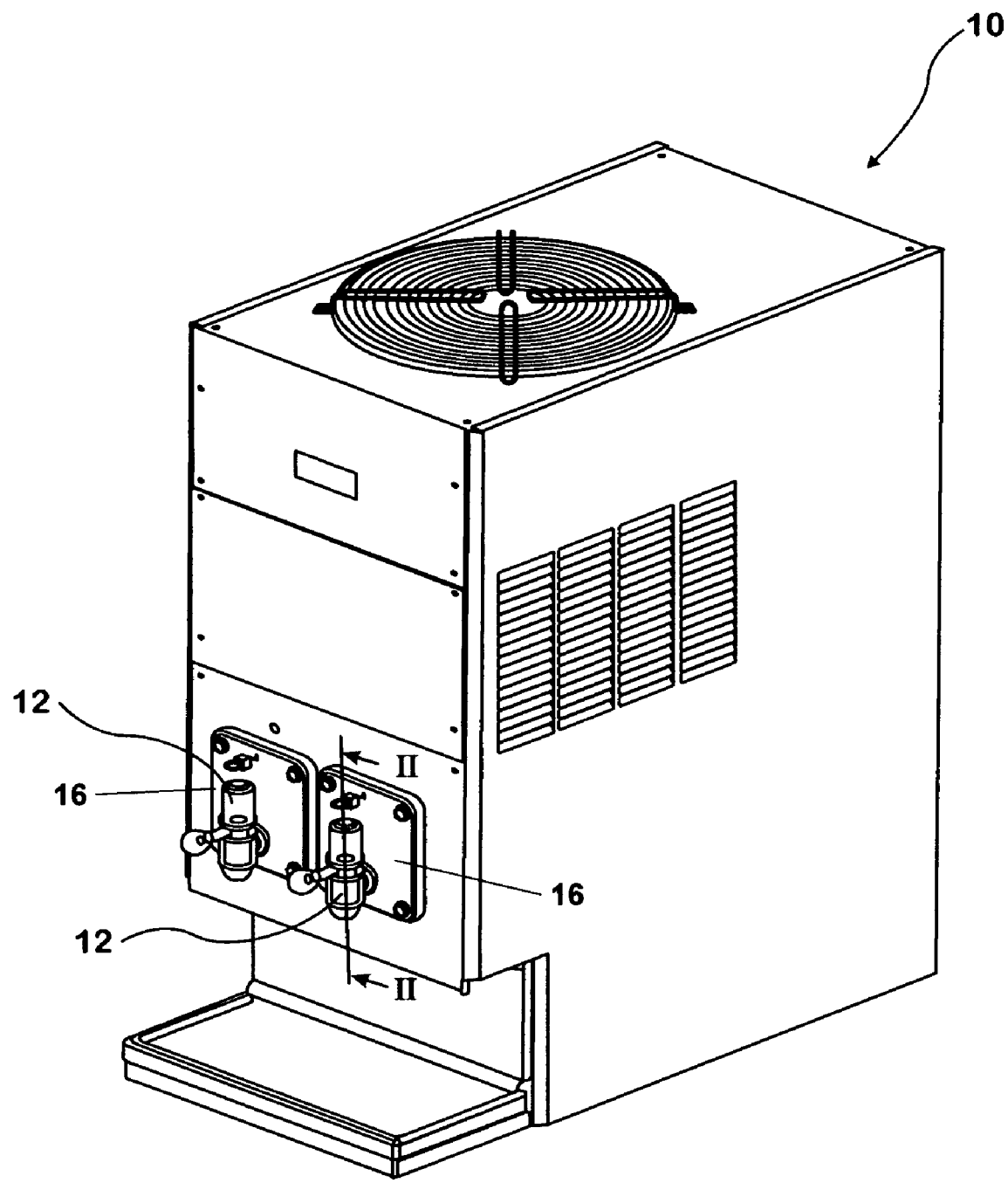
FIG. 1 is a perspective representation of a frozen beverage machine with a dispense valve according to the present invention.

In FIG. 1 a frozen beverage machine 10 is shown having first and second dispense valves or taps 12 for dispensing frozen beverage from respective first and second freeze barrels 14 (not shown in FIG. 1 for clarity), each freeze barrel having at its forward end an associated one of first and second end caps 16. The first and second taps 12 are each mounted on a respective one of the first and second end caps 16.

Figure 2:
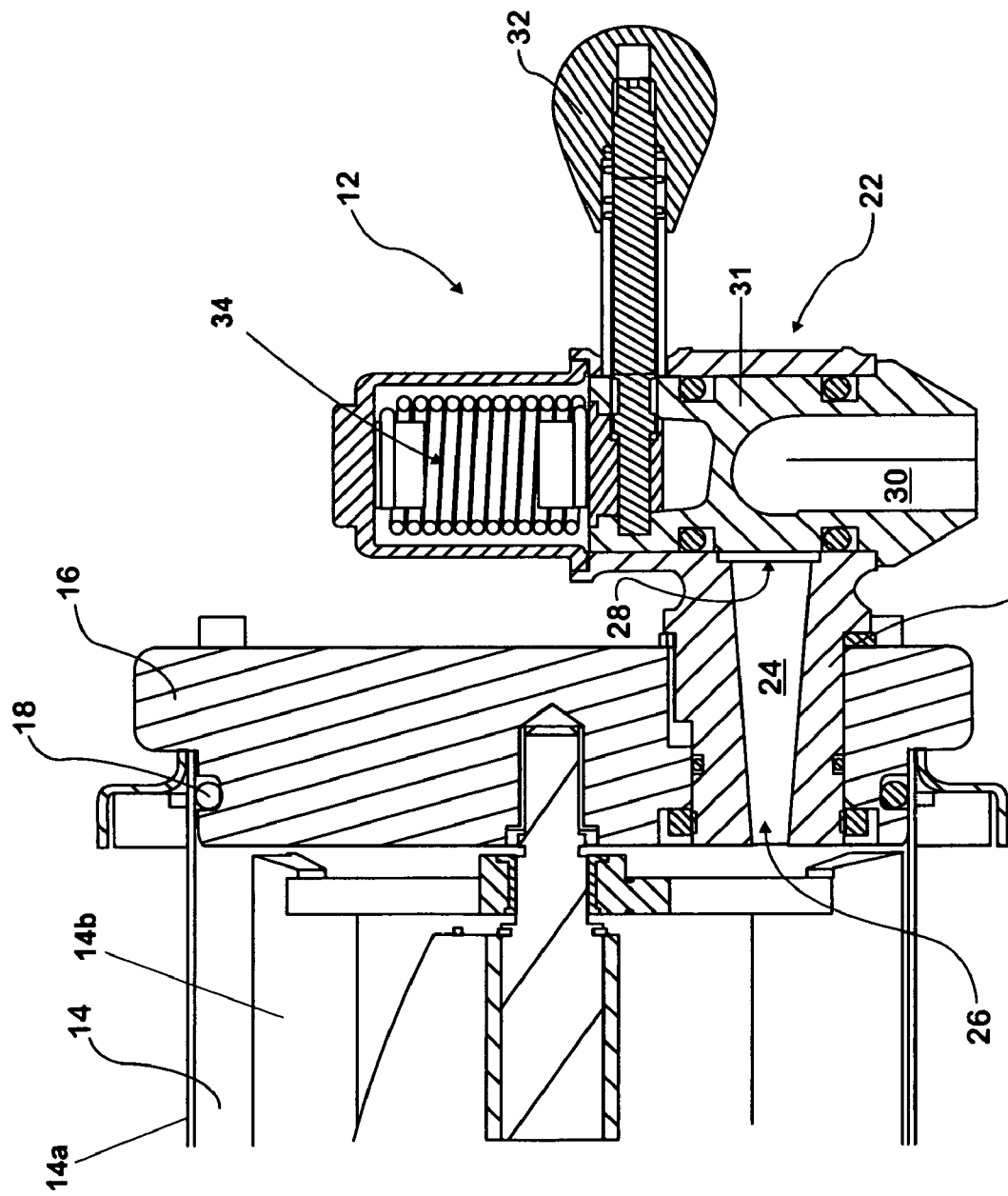
FIG. 2 is a side view of part of the machine of FIG. 1, sectioned along the line II-II in FIG. 1, and showing the dispense valve in greater detail.

Referring now to FIG. 2, the second freeze barrel 14 includes a cylindrical outer housing 14a within which is a rotatable scraper assembly 14b, and is shown with its end cap 16 engaged to a forward end of the cylindrical housing 14a. A seal 18 is arranged between the freeze barrel 14 and the end cap 16 to prevent leakage of the beverage from the barrel.

The end cap 16 supports a transition section in the form of an inlet portion 20 of the dispense tap 12. The inlet portion 20 in turn carries a valve body portion 22 of the dispense tap 12.

The inlet portion 20 defines a tapered bore 24 of circular cross-section which has an inlet 26 and an outlet 28. The outlet 28 has a diameter greater than the diameter of the inlet 26, and as seen the tapered bore has a progressively increasing cross-sectional area, and thereby a progressively increasing diameter, in the direction from its inlet to its outlet. It is possible within the scope of the invention that the bore 24 could have a cross-section other than circular. In such an embodiment, the cross-section of the outlet and thus the cross-sectional area of the outlet is greater than that of the inlet. The outlet 28 opens into a dispense cavity 30 extending through a rotatable valve member 31 carried within the valve body 22. The valve member 31 is activated or rotated by a handle 32 to control the flow of beverage from the freeze barrel 14 into, through and out of a lower outlet end of the dispense cavity 30 by placing an upper inlet end of the dispense cavity 30 into and out of communication with the outlet 28.

In use, upon operation of the handle 32 to dispense a drink from the tap 12, the valve 31 opens to permit beverage to flow under pressure from the freeze chamber 14 into the bore 24 and from there into the dispense cavity 30 before exiting the tap 12. Releasing the handle 32 causes the flow to stop resulting in a volume of frozen beverage remaining in the bore 24. Whilst ice will tend to conglomerate in this section it will slide down the bore to an area of increased cross-sectional area and as a result will not obstruct the bore 24. Consequently, the next time the tap is opened this small volume of ice will be dispensed without causing a blockage in the machine.

The handle 32 is operated in a rotary manner to align the upper inlet to the dispense cavity 30 with the outlet 28 of the tapered bore 24. Rotary action of the handle 32 acts against a spring 34 within the valve or dispense tap 12, such that when released the valve and thereby the valve member 31 returns to its closed position. As can be seen, when the valve is open there are no restrictions within the flow path from the freeze barrel 14 through the dispense tap 12, such that there are no features on which any agglomerated ice can become lodged, thereby preventing or restricting further flow. The dispense cavity 30 may be of circular cross-section, wherein the diameter of the dispense cavity 30 is at least as great as the diameter of the outlet 28 of the tapered bore 24. It is possible within the scope of the invention that the dispense cavity 30 may have a cross-section other than circular. It is also possible within the scope of the invention that the cross-section of the outlet 28 and dispense cavity 30 may be the same or different. It is also possible within the scope of the invention that the cross-section of the dispense cavity 30 is constant or increases in the direction of flow. In such embodiments, the minimum dimension of the outlet cavity is at least as great as the maximum dimension of the outlet 28, such that there is no restriction to flow downstream of the outlet 28.

What is claimed is:

1. A dispense valve for a frozen beverage machine having a freeze barrel, said dispense valve comprising a transition section and a valve body, said transition section having a tapered bore extending between an inlet to said bore for being fluid coupled directly to an outlet from the freeze barrel, so that frozen product flowing through the freeze barrel outlet flows directly into said tapered bore, and an outlet from said bore fluid coupled to an inlet to a dispense cavity of said valve body, said bore being free of any restrictions from its inlet to its outlet, increasing in cross-sectional area from its inlet to its outlet and being arranged to carry frozen beverage from the outlet from the freeze barrel of the machine to said inlet to said dispense cavity of said valve body, said valve body including a valve member for controlling flow of frozen beverage from the freeze barrel through said transition section bore to said inlet to said dispense cavity and through said dispense cavity to and through an outlet from said dispense cavity, said dispense cavity having throughout its length a cross-sectional area at least as great as the cross-sectional area of said transition section bore outlet.

2. A dispense valve as in claim 1, wherein said transition section bore has a circular cross-section.

3. A dispense valve as in claim 1, wherein said transition section bore defines a taper of at least 2 degrees on each side of the bore.

4. A dispense valve as in claim 1, wherein said dispense cavity extends through said valve member and said dispense valve has a rotary actuation mechanism.

5. A dispense valve as in claim 4, wherein actuation of said rotary actuation mechanism rotates said valve member and aligns said inlet to said dispense cavity with said outlet from said transition section tapered bore.

6. A dispense valve as in claim 5, wherein both said transition section tapered bore and said valve member dispense cavity are free of any restrictions.

7. A dispense valve as in claim 5, wherein the cross-sectional area of the flow path through said dispense cavity of said valve member does not decrease downstream from said tapered bore outlet.

* * * * *